United States Patent
Seydoux et al.

(10) Patent No.: US 8,989,924 B2
(45) Date of Patent: Mar. 24, 2015

(54) ALTITUDE ESTIMATOR FOR A ROTARY-WING DRONE WITH MULTIPLE ROTORS

(71) Applicant: Parrot, Paris (FR)

(72) Inventors: Henri Seydoux, Paris (FR); Francois Callou, Paris (FR); Mathieu Babel, Paris (FR)

(73) Assignee: Parrot, Paris (FR)

( * ) Notice: Subject to any disclaimer, the term of this patent is extended or adjusted under 35 U.S.C. 154(b) by 0 days.

(21) Appl. No.: 13/797,781

(22) Filed: Mar. 12, 2013

(65) Prior Publication Data

US 2013/0325217 A1 Dec. 5, 2013

(30) Foreign Application Priority Data

Mar. 30, 2012 (FR) ...................................... 12 52888

(51) Int. Cl.
G05D 1/04 (2006.01)
A63H 27/00 (2006.01)
G01C 5/00 (2006.01)

(52) U.S. Cl.
CPC ................ *G05D 1/042* (2013.01); *A63H 27/12* (2013.01); *G01C 5/005* (2013.01)
USPC .............. 701/4; 701/2; 701/3; 701/5; 701/11; 244/17.13; 244/17.17; 244/190; 345/173

(58) Field of Classification Search
CPC ....................................................... G05D 1/04
USPC .............. 701/2, 3, 4, 5, 11; 244/17.13, 17.17, 244/190; 345/173
See application file for complete search history.

(56) References Cited

U.S. PATENT DOCUMENTS

| 7,908,041 | B2* | 3/2011 | Cheok et al. ...................... 701/3 |
| 8,473,125 | B2* | 6/2013 | Rischmuller et al. ........... 701/11 |
| 8,583,296 | B2* | 11/2013 | Allen et al. ...................... 701/4 |
| 8,594,862 | B2* | 11/2013 | Callou et al. ..................... 701/2 |
| 8,599,646 | B2* | 12/2013 | Pochon .......................... 367/99 |
| 2008/0018525 | A1* | 1/2008 | Svy et al. ...................... 342/169 |
| 2011/0049290 | A1* | 3/2011 | Seydoux et al. ........... 244/17.13 |

(Continued)

FOREIGN PATENT DOCUMENTS

EP 2364757 A1 9/2011
EP 2400460 A1 12/2011

(Continued)

*Primary Examiner* — Thomas G Black
*Assistant Examiner* — Wae Louie
(74) *Attorney, Agent, or Firm* — Haverstock & Owens LLP

(57) ABSTRACT

The drone comprises altitude determination means (134), with an estimator (152) combining the measures of an ultrasound telemetry sensor (154) and of a barometric sensor (156) to deliver an absolute altitude value of the drone in a terrestrial system. The estimator comprises a predictive filter (152) incorporating a representation of a dynamic model of the drone making it possible to predict the altitude based on the motor commands (158) and to periodically readjust this prediction as a function of the signals delivered by the telemetry sensor (154) and the barometric sensor (156). Validation means analyze the reflected echoes and possibly modify the parameters of the estimator and/or allow or invalidate the signals of the telemetry sensor. The echo analysis also makes it possible to deduce the presence and the configuration of an obstacle within the operating range of the telemetry sensor, to apply if need be a suitable corrective action.

17 Claims, 9 Drawing Sheets

(56) References Cited

U.S. PATENT DOCUMENTS

| | | | |
|---|---|---|---|
| 2011/0221692 A1* | 9/2011 | Seydoux et al. | 345/173 |
| 2012/0232718 A1* | 9/2012 | Rischmuller et al. | 701/2 |
| 2013/0006448 A1* | 1/2013 | Callou et al. | 701/5 |
| 2013/0173088 A1* | 7/2013 | Callou et al. | 701/2 |
| 2013/0325217 A1* | 12/2013 | Seydoux et al. | 701/4 |
| 2014/0008496 A1* | 1/2014 | Ye et al. | 244/190 |
| 2014/0034775 A1* | 2/2014 | Hutson | 244/17.17 |
| 2014/0034776 A1* | 2/2014 | Hutson | 244/17.17 |

FOREIGN PATENT DOCUMENTS

| | | |
|---|---|---|
| EP | 2431084 A1 | 3/2013 |
| WO | 2010061099 A2 | 6/2010 |

* cited by examiner

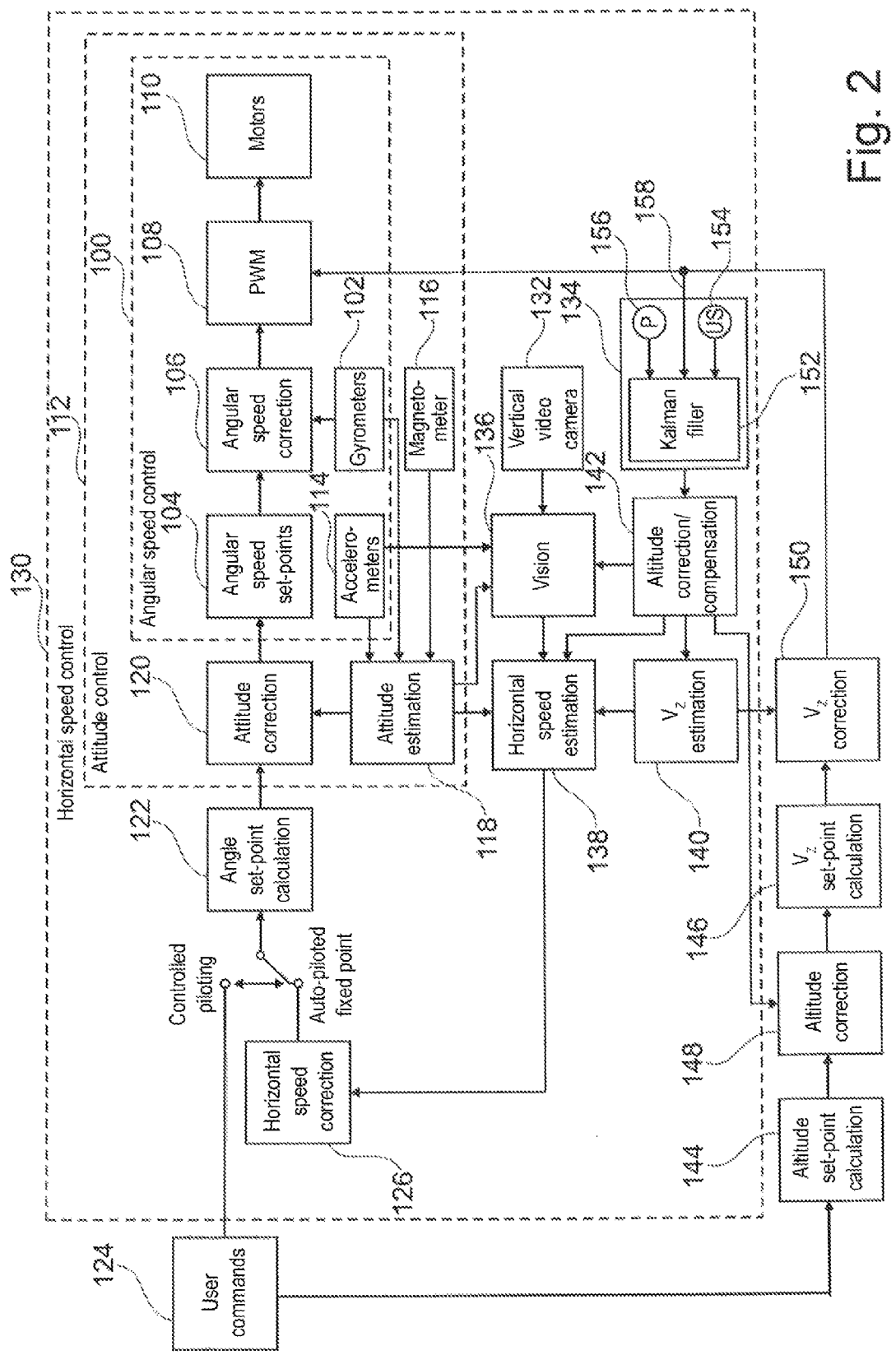

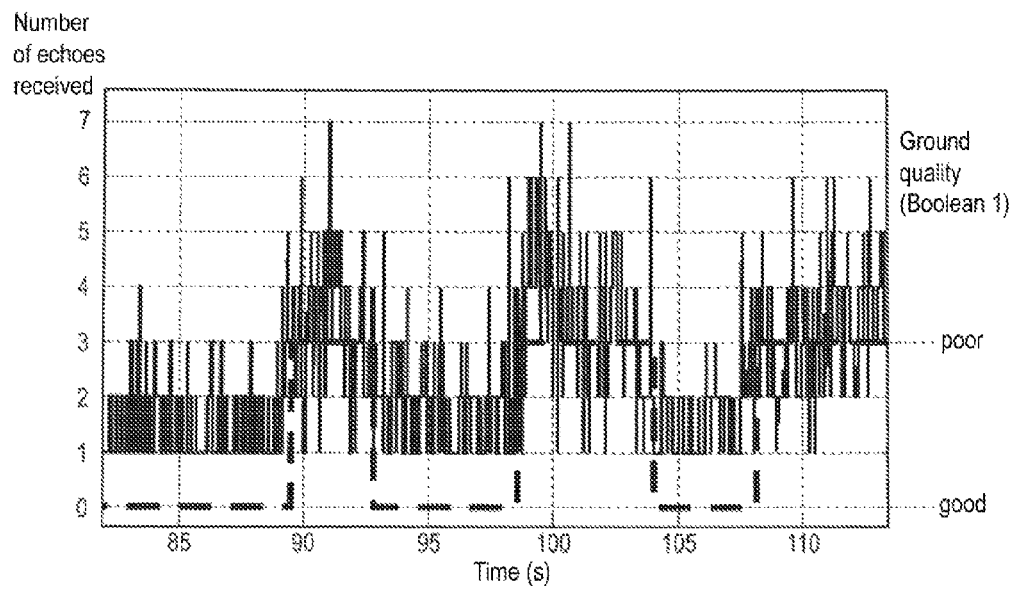
Fig. 5
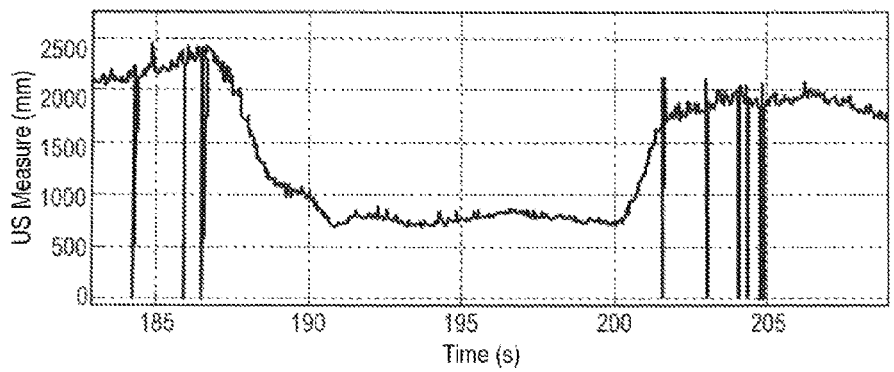
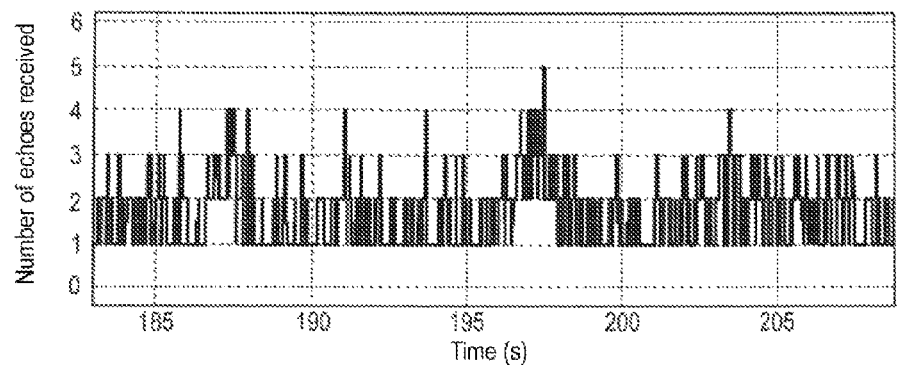
Fig. 6

ALTITUDE ESTIMATOR FOR A ROTARY-WING DRONE WITH MULTIPLE ROTORS

The invention relates to the rotary-wing drones such as quadricopters or the like.

Such drones are provided with multiple rotors driven by respective motors that can be controlled in a differentiated manner so as to pilot the drone in attitude and speed.

A typical example of such a drone is the AR.Drone of Parrot SA, Paris, France, which is a quadricopter equipped with a series of sensors (accelerometers, three-axis gyrometer, altimeter), a front camera taking an image of the scene toward which the drone is directed, and a vertical view camera taking an image of the overflown terrain.

The WO 2010/061099 A2 and EP 2 364 757 A1 (Parrot SA) describe such a drone, as well as the principle of piloting the latter through a phone or a multimedia player having a touch screen and an integrated accelerometer, for example a cellular phone of the iPhone type or a multimedia player or tablet of the iPod Touch or iPad type (registered trademarks of Apple Inc., USA). The drone is piloted by the user by means of signals emitted by the device tilt sensor, wherein the tilt movements of the device are replicated by the drone: for example, to make the drone move forward, the user tilts his device about the pitch axis thereof, and to move the drone aside to the right or to the left, the user tilts said device with respect to the roll axis thereof. That way, if the drone is controlled so as to tilt or "dive" downward (tilt about a pitch axis), it will move forward with a speed that is all the more high that the tilt angle is important; conversely, if it is controlled so as to "nose up" in the opposite direction, its speed will progressively slow down, then will invert, going back rearward. In the same way, for a control of tilt about a roll axis, the drone will lean to the right or to the left, causing a linear displacement in horizontal translation to the right or to the left.

The user has access to other commands, which are displayed on the touch screen, in particular "climb/descent" (throttle control) and "right rotation/left rotation" (rotation of the drone about its yaw axis).

The drone is also provided with a fixed-point switching command: when the user releases all the commands of his remote-control device, the drone stands still at the fixed point and stabilizes thereat in a fully automatic manner.

The invention more particularly relates to the evaluation of the altitude at which the drone progresses, and to the vertical stabilization of the latter during its progressions, based on the estimated altitude.

As used herein, "altitude" means the value of the instantaneous position of the drone in the vertical direction, considered in a fixed terrestrial system, such as a Galilean system, whose altitude zero will correspond to the position of the drone on the ground, at the time of lift-off. This "altitude" is thus an absolute quantity.

The drone such as the AR.Drone described in the above-mentioned documents is provided with an ultrasound (US) telemeter comprising an electroacoustic transducer for emission and reception of ultrasounds. Such transducer emits a short burst of ultrasounds of a few tens or hundreds of microseconds, and waits for the return of the acoustic echo sent after reflection on the ground. The time period separating the emission of the burst from the reception of the echo permits, knowing the speed of sound, to estimate the acoustic path length covered and thus to evaluate the distance separating the drone from the reflective surface. In reality, insofar as the beam of the US sensor is relatively wide (typically a cone of about 55° aperture), the transducer receives most often a multiplicity of echoes, and discriminates among these echoes the one which corresponds to the nearest point. This measurement is iterated at close intervals, with a typical frequency of recurrence of the ultrasound bursts of 25 Hz.

Such an altitude estimator implementing a US telemeter is described for example in the EP 2 400 460 A1 (Parrot SA), where it is used in particular to calculate the scale factor to be applied to successive images of the terrain overflown by the drone, used in particular to assess the horizontal speed of the latter with respect to the ground, in combination with the accelerometer data.

The result provided by a US telemeter, hereinafter the "distance", is in any event a relative quantity, which is function of the relief of the terrain overflown by the drone. Indeed, the measured distance may be different from the altitude (within the meaning indicated hereinabove), in particular when the drone comes to pass above an obstacle, for example if it overflies, at constant altitude, a table or a wall: for the duration of this overflight, the distance measured by the US telemeter will suddenly decrease, while the altitude will not have varied.

If only the telemeter indications are used, the risk is thus to make the drone do "terrain following", which is not the intention, in particular on uneven terrain, when it is only desired to keep the altitude at a stable value. The invention aims to solve a number of problems resulting from this phenomenon, as well as other drawbacks specific to US telemetry sensors.

Such sensors have the following characteristics:
- the measure produced is only a relative measure of the altitude (telemetry, distance measurement);
- in real situation, the measure is very noisy, due to multiple echoes reflected by the ground, to the more or less reflective terrain and to frequent signal disappearance, for example when the drone overflies an absorbing terrain (shrubs . . . );
- the range is limited, about 6 m in the case of the AR.Drone described in the above-mentioned documents, and beyond this value the telemetry signal suddenly disappears;
- on the other hand, the measurement is very fast, it may be reiterated at high frequency (typically 25 Hz), and its accuracy is excellent, of the order of a few centimeters on a measurement scale going from a few tens of centimeters to several meters.

To compensate for these drawbacks, it is possible to use, in combination with the telemetry sensor, another type of sensor, i.e. a pressure sensor, or barometric sensor.

A barometric sensor is used to measure the variations of pressure during the flight, such variations being correlated to the variations of altitude. It is therefore possible to obtain an absolute measure of the altitude by integrating these variations from an altitude zero at the time of lift-off.

A barometric sensor has the following characteristics:
- it provides an absolute measure, independent on the overflown terrain;
- it can be used at high altitude, with no upper limit;
- on the other hand, it is slow and not much accurate, insofar as it is necessary to integrate pressure variations;
- besides, it suffers from aerodynamic disturbance, in particular at low altitude, due to the ground effect, when the drone rotors produce high turbulences making the signals delivered by the pressure sensor unusable.

Actually, a simple combination of the signals delivered concurrently by two telemetry and barometric sensors does not always allow obtaining a correct estimation, continuously evaluated, of the drone altitude.

Yet, if it is desired in particular to control the drone so as to stabilize it in the vertical direction, in fixed-point condition or in piloted flight, it is required to obtain a continuous and reliable measure of the altitude, in a manner that does not risk disturbing the control loops controlling the drone stabilization.

Therefore, the object of the invention is to propose a drone comprising altitude determination means provided with algorithms for validating and possibly readjusting the estimated altitude measure, which make it possible to solve this difficulty in any circumstance, in particular when the drone flies over a terrain whose nature and singularities are a priori unknown and unforeseeable.

The invention proposes for that purpose a drone of the general type disclosed by the above-mentioned EP 2 400 460 A1, i.e. a rotating-wing drone with multiple rotors driven by respective motors controlled by application of differentiated motor commands so as to pilot the drone in attitude and speed, such drone comprising altitude determination means, adapted to deliver an absolute altitude value of the drone expressed in an absolute terrestrial system, comprising a telemetry sensor adapted to estimate a relative distance separating the drone from a surface reflecting echoes of ultrasound pulses emitted by the drone.

According to a characteristic of the invention, the altitude determination means further comprise a barometric sensor adapted to deliver a drone altitude variation signal, and an estimator receiving as an input the signals delivered by the telemetry sensor and by the barometric sensor, and combining these signals to deliver as an output said absolute value of altitude of the drone. Furthermore, means for validating the signal delivered by the telemetry sensor analyze the echoes reflected, and, based on the result of this analysis, modify accordingly the parameters of the estimator and/or allow or inhibit the application to the estimator of the signal delivered by the telemetry sensor. Finally, obstacle detection means analyze the echoes reflected, and, based on the result of this analysis, deduce the presence and the configuration of an obstacle within the operating range of the telemetry sensor and apply to the estimator a corrective action adapted to compensate for the effect of the obstacle on the relative distance estimated by the telemetry sensor.

Very advantageously, the estimator comprises a predictive filter incorporating a representation of a dynamic model of the drone, this filter being adapted to perform a prediction of said absolute value of altitude of the drone based on said motor commands and to periodically readjust this prediction as a function of the signals delivered by the telemetry sensor and by the barometric sensor.

This predictive filter is in particular a four-state filter, comprising: said absolute value of altitude, counted with respect to a lift-off position of the drone; a component of drone vertical speed; a bias of said motor commands with respect to said dynamic model of the drone; and a bias of the barometric sensor.

According to various subsidiary advantageous characteristics:
- the validation means comprise means for estimating the quality of said surface reflecting the echoes, as a function of the number of echoes received concurrently for a same pulse emitted, and/or as a function of the dispersion between the distance values obtained for a time succession of pulses emitted by the telemetry sensor;
- the validation means comprise means for rejecting the distance values estimated by the telemetry sensor, as a function of an analysis of coherence of a plurality of distance values obtained for a time succession of pulses emitted by the telemetry sensor, and/or as a function of the difference of a current distance value with respect to a distance prediction obtained from a plurality of distance values obtained for a time succession of pulses emitted by the telemetry sensor;
- the rejection means operate with respect to variable thresholds, as a function of an estimation of quality of the surface reflecting the echoes;
- it is further provided means for calculating an altitude offset value at the time when the rejection means reject the estimated distance values, and for adding this offset value to the estimated distance value when the rejection means no longer reject the estimated distance values;
- the obstacle detection means comprise means for detecting, in the distance values obtained for a time succession of pulses emitted by the telemetry sensor, two consecutive jumps of opposite sign with similar distance values obtained before and after these two jumps, advantageously with means for calculating an altitude offset value at the time of the first jump, and for adding this offset value to the distance value estimated at the time of the second jump;
- the obstacle detection means comprise means for detecting an oscillation, between two values, of the distance values obtained for a time succession of pulses emitted by the telemetry sensor when the drone is in a fixed-point state;
- the obstacle detection means comprise means for smoothing the distance values successively obtained in the presence of a detected oscillation;
- the obstacle detection means comprise means adapted to detected a loss of the signal delivered by the telemetry sensor due to an absence of reflected echo, to calculate an altitude offset value at the time of this loss of signal, and to apply this offset value as a telemetry signal at the input of the estimator. In particular, in case of telemetry signal loss: i) if the altitude of the drone is lower than a given threshold altitude, the recorded offset value is applied at the input of the estimator if this recorded value is present, a predetermined value being applied in the opposite case, and ii) if the altitude of the drone is higher than said given threshold altitude, the recorded offset value is applied unchanged at the input of the estimator.

An exemplary embodiment of the device of the invention will now be described, with reference to the appended drawings in which same reference numbers designate identical or functionally similar elements throughout the figures.

FIG. 2 is a block diagram of the different organs of control, servo-control and assisted piloting of the drone.

FIG. 5 is a chronogram showing the successive states of the Boolean indicator representative of the ground quality as a function of the number of echoes received by the US sensor.

FIG. 6 shows two chronograms illustrating the variations of the raw measure delivered by the US sensor, and the number of echoes received simultaneously, during the overflight of a terrain having variable characteristics of absorption of the US signal emitted.

Figure 1:
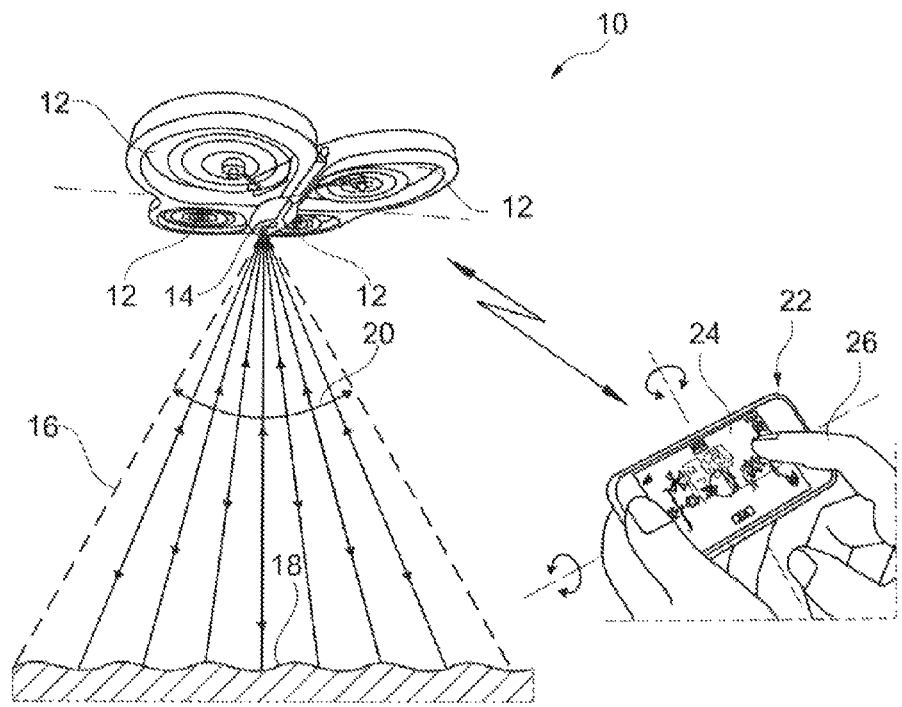
FIG. 1 is an overall view showing the drone and the associated remote-control device for the remote piloting thereof.

In FIG. 1, the reference 10 generally designates a drone, for example a quadricopter such as the above-mentioned AR.Drone described in the WO 2010/061099 A2 and EP 2 364 757 A1, as well as the FR 2 915 569 A1 (which describes in particular the system of gyrometers and accelerometers used by the drone) and EP 2 431 084 A1 (which describes in particular how to control predetermined trajectories).

The drone 10 comprises four coplanar rotors 12, whose motors are controlled independently by an integrated system of navigation and attitude control.

Inertial sensors (accelerometers and gyrometers) allow measuring with a certain accuracy the angular speeds and the attitude angles of the drone, i.e. the Euler angles describing the drone tilt with respect to a horizontal plane of a fixed terrestrial system.

The drone is provided with a first front view camera for obtaining an image of the scene toward which it is oriented, as well as a second vertical view camera, pointing downward to take successive images of the overflown terrain and used in particular to evaluate the speed of the drone with respect to the ground, in combination with the accelerometer data, thanks to a software that estimates the displacement of the scene taken by the camera from an image to the following one, and applies to this estimated displacement a scale factor that is function of the measured altitude. This technique is described in detail in the above-mentioned EP 2 400 460 A1, to which it may be referred to for further details.

An ultrasound telemeter arranged under the drone and an on-board barometric sensor further provide measures that, when combined together, give an estimation of the altitude of the drone with respect to the ground.

More precisely, the ultrasound telemeter comprises an electro-acoustic transducer 14 generating toward the ground 18 a short ultrasound burst (of a few tens or hundreds of microseconds) in an approximately conical beam 16, with an aperture angle 20 of the order of about 55°. The reflection of this beam on the ground 18 produces acoustic echoes that are received by the transducer 14 and analyzed so as to estimate the acoustic path length covered, based on the time period separating the emission of the burst from the reception of the first echo and on the speed of sound, and to therefore evaluate the distance separating the drone 10 from the ground 18.

According to a characteristic of the invention, this distance measure is tallied with a measure of the pressure variations produced by the variations of altitude of the drone during its progression, as will be explained hereinafter.

The drone 10 is piloted by a remote-control device 22 provided with a touch screen 24 displaying the image borne by one of the drone cameras, with superimposition of a number of symbols allowing the activation of piloting commands by simple contact of the finger 26 of a user on the touch screen 18. The device 22 is provided with tilt sensors for controlling the attitude of the drone by imparting corresponding tilts to the device. For bidirectional data exchange with the drone, radio link means are also provided, for example of the local network type such as Wi-Fi (IEEE 802.11) or Bluetooth (registered trademarks). As indicated in introduction, the remote-control device 22 is advantageously consisted by a phone or a multimedia player having a touch screen and an integrated accelerometer, for example a cellular phone of the iPhone type, a multimedia player of the iPod Touch type or a multimedia tablet of the iPad type, which are devices incorporating the various organs of control required for the display and detection of the piloting commands, for the visualization of the image taken by the front camera, and for the bidirectional data exchange with the drone by Wi-Fi or Bluetooth link.

The piloting of the drone 10 consists in making the latter progress by controlling the motors in a differentiated manner to generate, according to the case, movements of:
a) rotation about a pitch axis, to make the drone move forward or reward; and/or
b) rotation about a roll axis, to move the drone aside to the right or to the left; and/or
c) rotation about a yaw axis, to make the main axis of the drone rotate to the right or to the left; and/or
d) translation downward or upward by changing the gas regime, so as to reduce or increase, respectively, the altitude of the drone.

When these piloting commands are applied by the user from the device 22 ("controlled piloting" configuration, commanded by a user), the commands a) and b) are obtained by tilts of the device: for example, to make the drone move forward, the user just has to tilt the device by leaning it forward, to move the drone aside to the right, the user just has to tilt the device by leaning it toward the right, etc. The commands c) and d) result from actions applied by a contact of the user's finger on corresponding specific zones on the touch screen (it may be referred to the above-mentioned WO 2010/061099 A2 and EP 2 364 757 A1 for further details about those aspects of the system).

The drone also has an automatic and autonomous system of stationary flight stabilization (auto-piloted "fixed-point" configuration), activated in particular as soon as the user removes his/her finger from the touch screen of the device, or automatically at the end of the lift-off phase, or also in case of interruption of the radio link between the device and the drone. The drone then switches to a lift condition in which it will be automatically immobilized and stabilized, without any intervention of the user.

Control and Servo-Control of the Drone Motors

The way the piloting set-points for the motors of the drone are defined will now be exposed, with reference to FIG. 2, which is a functional-block diagram of the various organs of control and servo-control of the drone.

It will be noted that, although these diagrams are presented as interconnected circuits, the various functions are essentially software-implemented, this representation being only illustrative.

More generally, as illustrated in FIG. 2, the piloting system involves several imbricated loops for the control of the drone horizontal speed, angular speed and attitude, in addition to the altitude variations.

The most central loop, which is the angular speed control loop 100, uses on the one hand the signals provided by gyrometers 102, and on the other hand, a reference consisted by angular speed set-points 104. These various pieces of information are applied at the input of an angular speed correaction stage 106, which itself pilots a control stage 108 for controlling the motors 110 so as to regulate separately the regime of the various motors to correct the angular speed of the drone by the combined action of the rotors driven by these motors.

The angular speed control loop 100 is imbricated in an attitude control loop 112, which operates based on indications provided by the gyrometers 120, by accelerometers 114 and by a magnetometer 116 giving the absolute orientation of the drone in a terrestrial geomagnetic system. The data delivered by these various sensors are applied to an attitude estimation stage 118 of the PI (Proportional-Integrator) type. The stage 118 produces an estimation of the real attitude of the drone, applied to an attitude correction stage 120 that compares the real attitude to angle set-points generated by a circuit 122 based on commands directly applied by the user 124 ("controlled piloting" configuration) and/or data generated internally by the automatic pilot of the drone, via the horizontal speed correction circuit 126, to keep the drone in a standstill position (auto-piloted "fixed-position" configuration). The possibly corrected set-points applied to the circuit 120 and compared with the real attitude of the drone are transmitted by the circuit 120 to the circuit 104 to suitably control the motors.

To sum up, based on the error between the set-point (applied by the user and/or generated internally) and the angle measure (given by the attitude estimation circuit 118), the attitude control loop 112 calculates an angular speed set-point using the PI corrector of the circuit 120. The angular speed control loop 110 then calculates the difference between the preceding angular speed set-point and the angular speed effectively measured by the gyrometers 102. The loop calculates, based on this information, the various set-points for the rotation speed (and thus for the ascensional force), which are sent to the motors 110 to execute the manoeuver demanded by the user and/or planed by the automatic pilot of the drone.

The horizontal speed control loop 130 uses a vertical video camera 132 and an altitude estimator circuit 134 (describes in further details hereinafter). A circuit 136 processes the images produced by the vertical camera 132, in combination with the signals of the accelerometer 114 and of the attitude estimation circuit 118, to estimate by means of a circuit 138 the two components of the horizontal speed of the drone. The estimated horizontal speed are corrected by the vertical speed estimation given by a circuit 140 and by an altitude value obtained from the estimator 134 and an altitude value correction/compensation circuit 142 in some particular flight configurations of the drone (this aspect will also be described in further details hereinafter).

Regarding the vertical displacements of the drone, the user 124 applies commands to a circuit 114 of calculation of altitude set-points, such set-points being applied to a circuit 146 of calculation of ascensional speed set-point $V_Z$ via the altitude correction circuit 148 receiving the altitude estimation given by the circuit 142. The calculated ascensional speed $V_Z$ is applied to a circuit 150 that compares this speed set-point to the corresponding speed estimated by the circuit 140 and modified accordingly the motor control data (circuit 108), so as to increase or reduce the rotation speed simultaneously on all the motors, in order to minimize the difference between the ascensional speed set-point and the measured ascensional speed.

Estimation of the Drone Altitude

The invention more particularly relates to how the altitude estimation circuit 134 and the estimated altitude value correction/compensation circuit 142 operate.

The operation of the altitude estimation circuit 134 will be first described. This circuit implements a state estimator of the "Kalman filter" type, which is an infinite pulse response filter that estimates the states of a dynamic system (the drone in the present case) based on a series of measures applied at the input. The general principles of this technique may be found, for example, in R. E. Kalman, *A new Approach to Linear Filtering and Prediction Problems*, Transactions of the ASME—*Journal of Basic Engineering*, Vol. 82 (1960).

In the present case, the Kalman filter receives as an input:
the signal delivered by the US sensor 154,
the signal delivered by the barometric sensor 156, and
at 158, the ascension speed set-point (hereinafter "PWM set-point") produced by the circuit 150 of correction of the vertical speed $V_Z$ and applied to the drone motor (circuit 108): the PWM set-point represents the vertical thrust power resulting from the simultaneous control of the four motors of the drone.

The dynamic system of the Kalman filter is consisted by a set of equations that describes the drone behavior. Such a model is described in particular in the EP 2 431 084 A1, to which it may be referred to for further details.

The Kalman filter 152 operates in two phases, with successively:
a prediction phase, executed at each iteration of the filter: this phase consists in predicting the altitude of the drone at the current time by means, on the one hand, of the PWM set-point, and on the other hand, of the dynamic model of the drone;
a readjustment phase, which consists in correcting the prediction using the current measures delivered by the US sensor 154 and the barometric sensor 156. This step is not necessarily performed at each iteration because, as will be seen hereinafter, the US sensor measures are not necessarily always available.

The Kalman filter uses and estimates four states, i.e.:
the altitude of the drone with respect to its starting point (position at the time of lift-off),
the vertical speed $V_Z$,
the bias of the PWM set-point, and
the bias of the pressure measure delivered by the barometric sensor 156.

The state corresponding to the bias of the PWM set-point represents the error of the drone thrust model: the thrust model may indeed vary as a function of different parameters such as the weight of the drone, the aerodynamic efficiency of the propellers (this efficiency depending on the state of the propellers and on the air pressure), etc. The bias state of the PWM set-point serves to readjust the model in flight using the measures provided by the two sensors, which permits in particular to be more precise when these measures disappear.

The bias state of the pressure measure permits to correct the barometric sensor drifts. The latter appear mainly at the lift-off, at the start of the motors and during the first seconds of flight with the rising in temperature. Such drifts may also appear when the pressure environment is modified in other circumstances, for example when the drone progresses inside a room and when a person opens a window of this room, etc. This bias state of the pressure measure is estimated based on the measures of the US sensor 15. When the US measurement is no longer available, for example when the drone gains altitude beyond the US sensor range, or does no longer receive echo for another reason (too absorbing ground), the bias state of the pressure measure is no longer estimated, it is kept at a constant value.

To readjust the states of the filter, the latter uses three observations:

the distance measure, given by the US sensor 154, possibly corrected by a so-called offset value when passing an obstacle (this aspect will be developed in further details hereinafter). It will be noted that this observation is not always available: in optimal conditions, smooth ground and low altitude, the measure is provided at a recurrence frequency of 25 Hz, i.e. one time out of eight with respect to the frequency of recalculation of the drone piloting data, which is typically of 200 Hz. On the other hand, the measure disappears as soon as the altitude exceeds the operating range of the ultrasound telemeter, typically beyond 6 m, and it may further be regularly rejected when passing obstacles or over a chaotic ground (this aspect will be described in further details hereinafter, in particular how the decisions to reject or not the measure delivered by the US sensor are taken);

the pressure measure, given by the barometric sensor 156, corrected of its own offset. This measure is generally present at each iteration, it is however deactivated when the drone is very close to the ground, typically at less than 20 cm from the ground, taken into account the disturbing blast effects that strongly interfere with the pressure measure; and the zero altitude measure, which is used only when the drone is not in flight; it is a virtual measure that permits to make sure that the altitude value delivered to the navigation circuits remains fixed to zero.

Validation of the Data Delivered by the Ultrasound Telemeter

This aspect of management of the signal delivered by the US telemetry sensor has for purpose i) to decide if, at a given time, the US measure is present and if it is usable, and ii) if need be, to update the offset value when passing an obstacle.

The characteristics of the US measure being strongly linked to the more or less reflective nature of the ground, and being further very different according to whether the drone is in fixed point condition or in horizontal displacement, several algorithms are used to manage the various cases liable to be met.

Figure 3:
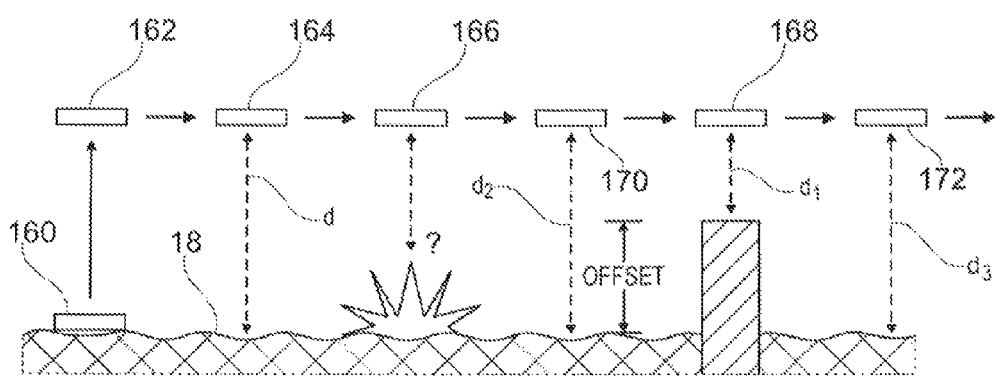
FIG. 3 illustrates various configurations of overflight of a terrain by the drone, at constant altitude.

FIG. 3 illustrates these various configurations of overflight of the terrain by the drone.

Initially, the drone is put on the ground and standstill (position 160); the altitude value is then forced to zero.

The drone then goes up above the ground (position 162), and executes a horizontal displacement move, at constant altitude (positions 164 to 172).

The US sensor does not give an indication of the altitude absolute value; it gives only a representation of the distance d separating the drone from the ground 18.

In the case of a horizontal, regular and well reflective ground, this distance may be evaluated without ambiguity. On the other hand, when the drone overflies, for example at 166, a little reflective ground (shrubs, etc.), the returned echoes are either inexistent or erratic, leading to a very noisy measure.

Another aspect is passing an obstacle, for example overflying a wall outdoor or a table indoor, as illustrated at 168 in FIG. 3: if the obstacle is reflective, the telemeter will measure a distance $d_1$ (position 168) very lower that those $d_2$ and $d_3$ measured before and after the overflight of the obstacle (positions 170 and 172), whereas the drone progresses at constant (absolute) altitude. The obstacle clearing, revealed by a sudden reduction of the US sensor signal, will thus have to be compensated for by an "offset" applied to the US measure during the obstacle clearing.

Therefore, it is necessary:

to evaluate the quality of the received signal to validate or invalidate the measure delivered by the US sensor, and, if this measure is validated, to manage the offset that has possibly to be added to it.

Figure 4:
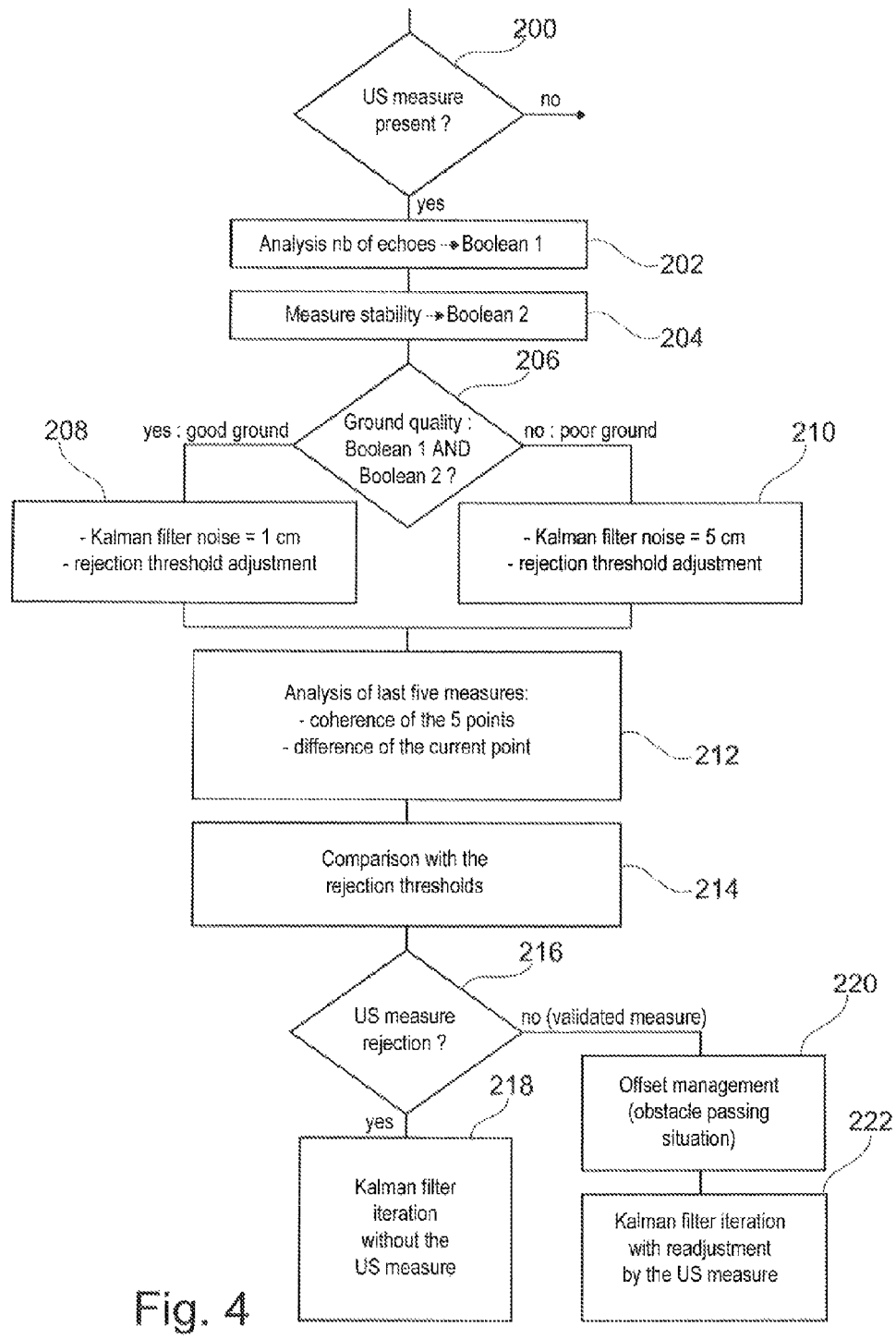
FIG. 4 is a flow chart of the various functions of validating the US sensor measurements and of applying possible corrective measures.

These functions of validating measures and applying possible corrections are illustrated in the flowchart of FIG. 4.

The analysis of the US signal is of course operated only if the sensor delivers a signal (test 200), i.e.: i) 1 cycle out of 8 cycles of data recalculation, and ii) if at least one echo is detected in the time window corresponding to the US sensor range.

It is then advisable to estimate the quality of the ground overflown by the drone (blocks 202 and 204), more precisely, the quality of reflection of the echoes emitted by the US transducer, the reflection being is very good on a smooth ground, but very noisy on a more diffuse ground.

To take such variations into account, the setting of the Kalman filter measurement noise will be adapted as a function of a good/poor Boolean indicator of the ground quality (test 206): for example, the noise level of the filter will be adjusted to 5 cm (block 208) on a plain ground, of good quality, whereas it will be adjusted to 15 cm (block 210) on a ground of poor reflective quality. That way, on a plain ground, the filter will adjust precisely the estimated altitude to the distance measure provided by the US telemeter, whereas it will less trust the latter, and thus will filter more efficiently the noise, on a poor quality ground.

This good/poor Boolean indicator of ground quality will also serve to modify the rejection thresholds for the subsequent validation or invalidation of the measure, and will also serve to manage the offset—these aspects will be described hereinafter.

The overall estimation of the ground quality involves merging two specific Boolean indicators, one resulting from the analysis of the number of echoes (block 202) and the other from the more or less stable character of the measures successively produced by the US telemeter (block 204). The ground will be declared as good (test 206) if the two Boolean indicators correspond to a good ground; it will be declared as poor in the other case, i.e. if at least one of the two Boolean indicators considers the ground as poor.

More precisely, the first ground quality evaluation criterion (block 202) consists in evaluating the nature of the ground as a function of the number of echoes reflected and picked-up by the transducer.

Concretely, the distance measure of the US telemetry sensor corresponds to the return time of the first echo. But many other echoes are also received and recorded by the transducer, and the number of echoes received may constitute an estimation of the ground quality: for example, on a plain ground, generally only one or two echoes are received, whereas, on a chaotic ground (bushes or obstacles), the number of echoes may rise up to six or seven.

This measure of the number of echoes being relatively noisy, it is firstly filtered using a first order recursive filter. The algorithm then applies a hysteresis thresholding (with for example a high threshold at 3 echoes and a low threshold at 2 echoes) to obtain the first Boolean indicator of ground. FIG. 5 illustrates the result thus obtained for the example of flight in a configuration where the drone overflies alternately a smooth ground and bushes.

The second ground quality evaluation criterion (block 204) is based on the stability of the successive distance measures delivered by the US sensor. Indeed, in some cases, the number of echoes is not sufficient to rule on the ground quality.

Therefore, in FIG. 6 is illustrated an example showing the simultaneous variations of the raw measure delivered by the US sensor and of the number of echoes received, during the overflight of a terrain having variable characteristics of absorption of the US signal emitted. It is noticed that the measure given by the US sensor is very noisy, indicating a ground of poor reflective quality, whereas the number of echoes remains low and is not sufficient to declare the ground as "poor" on the only basis of the first Boolean indicator (function of the number of echoes received).

To take this case into account, a second Boolean indicator of the ground quality is calculated, by observing the dispersion of the measure: at each new measure delivered by the US sensor, the algorithm calculates the difference (in absolute value) with respect to the preceding value. This value is then filtered by a low-pass filter (the same as for the filtering of the number of echoes), then thresholded. A value for example higher than 40 mm will lead to give the "poor" value to the second Boolean indicator. This value of 40 mm is chosen to correspond, with a measurement recurrence of 25 Hz, to a vertical speed of 8 m/s, a speed never reached by the drone, which minimizes the incidence of the bias that could appear when the drone has a non-zero vertical speed.

In practice, so that passing an obstacle does not trigger the test, only the dispersions for example lower that 50 cm are kept; a higher dispersion will be considered as resulting from an obstacle jumping and not as a dispersion revealing a poor quality ground.

After having evaluated the ground quality, the algorithm decides whether the measure delivered by the US sensor has to be validated or rejected.

A validation test (steps 212 to 216 in FIG. 4) will now be described, which makes it possible to respond to the following requirements:

using only the measure produced by the US sensor and not the prediction of the filter, so as to gain in robustness and not to reject the US measure in the cases where the latter is good and the filter model is failing (for example in a configuration with lateral wind);

presenting a memory effect over several iterations: indeed, in the case where the detection is very disturbed (bushes, etc.), a simple detection of a jump in the value delivered by the sensor is not sufficient, because it may lead to accept this value too rapidly whereas the measure is not stable, so that it is preferable to check the coherence of the measure over a greater number of points;

no being sensitive to the vertical speed of the drone: to reject rapidly any perturbation, it is indeed necessary to have rather strict thresholds on the measured quantity, which has to be independent of the vertical speed to avoid any risk of rejection of the measure in the climb and descent phases of the drone.

The test of coherence of the measure involves (block 212 in FIG. 4) maintaining a history of the last five measures of the US sensor and applying a linear regression to these latter.

The coherence of the five points between each other is then calculated for example by summing up the differences of each point with respect to the regression line calculated based on the five prior measures. If the five points recorded in the history are not coherent between each other (too high dispersion) or if the current measure (the US sensor measure) is too distant from the measure predicted by the regression calculation, then the current measure is be rejected.

Figure 7:
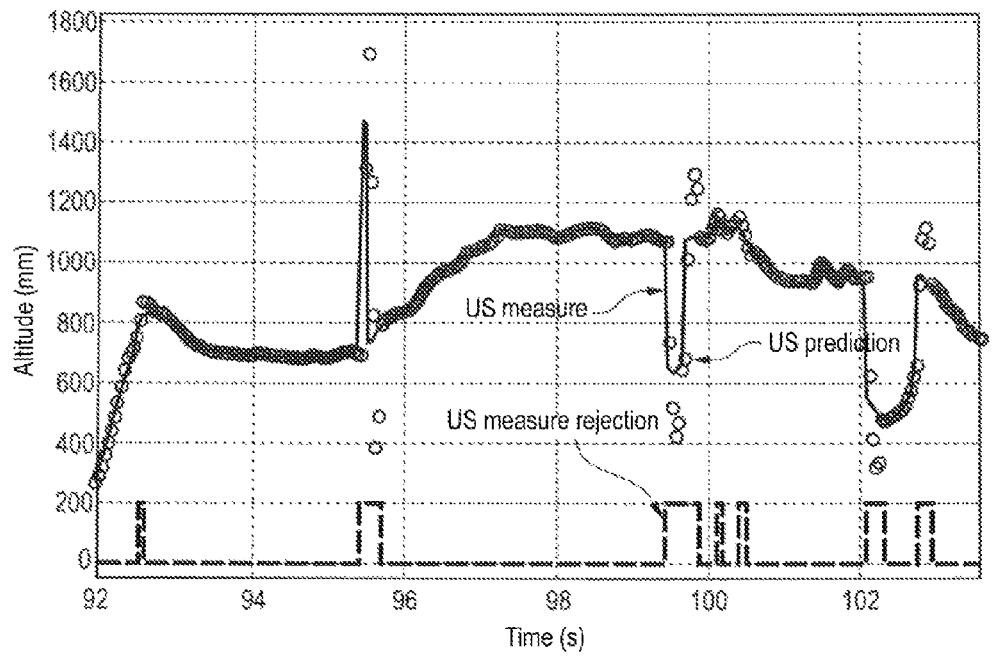
FIG. 7 is a chronogram showing the successive states of the Boolean indicator representative of the coherence of the measures delivered by the US sensor as a function of the values of these measures successively acquired and predicted.

FIG. 7 illustrates an example showing on the same diagram the US measure delivered by the sensor, the altitude predicted by the regression calculation and the validation/rejection result of the US measure.

It is noticed that, in the climb phases as in the first seconds, the US measures are not rejected: that comes from the fact that the regression takes into account the vertical speed (altitude increase). On the other hand, there is effectively rejection of the measure when passing an obstacle (around t=99-100 s and 102-103 s), and the measure is again accepted after a return to five successive coherent samples has been stated.

This coherence test compares (block 214) i) the coherence of the five measures recorded, and ii) the difference of the current point with respect to the prediction, with respect to two respective thresholds. Advantageously, these two thresholds are not constant and vary as a function of two parameters, i.e. the ground quality indicator (previously determined, in the indicated manner) and the speed of displacement of the drone. Hence:

on a plain ground, the two thresholds are fixed to a mean value providing a good rejection of perturbations while insuring a low risk of false obstacle detection: for example, respective values of 50 mm (coherence of the five points) and 20 mm (difference of the current point);

on a disturbed ground, with the drone in fixed point condition or with a low translation speed (lower than 300 mm/s), the ultrasound measure is more noisy, due to the nature of the ground: the Kalman filter setting is adapted accordingly to avoid a too important rejection rate, and the above-mentioned thresholds are fixed respectively to 100 mm and 50 mm;

on a disturbed ground, with the drone in move (translation speed higher than 300 mm/s), the US measure is very liable to jump from one echo to one another, and the confidence index is low. It is therefore necessary to reject it in case of any doubt, and for that purpose the threshold on the current point is chosen very low: the respective thresholds are then fixed, for example, to 100 mm and 10 mm.

Following these various tests, the US measure is finally rejected or validated (test 216 in FIG. 4).

In case of rejection (block 218), the Kalman filter does not use the current US measure, and establishes its prediction only based on motor piloting set-points (input 158 in FIG. 2) and on the signal delivered by the barometric sensor (156 in FIG. 2).

In the opposite case (validated measure), if the US measure returns to a valid state after having been rejected, it is potentially offset by an offset value if the previous rejection was the result of passing above an obstacle. This situation is managed at the block 220 of FIG. 4.

In any case, if the measure is validated, the Kalman filter uses (block 222) the measure delivered by the US sensor (input 154 in FIG. 2).

Figure 8:
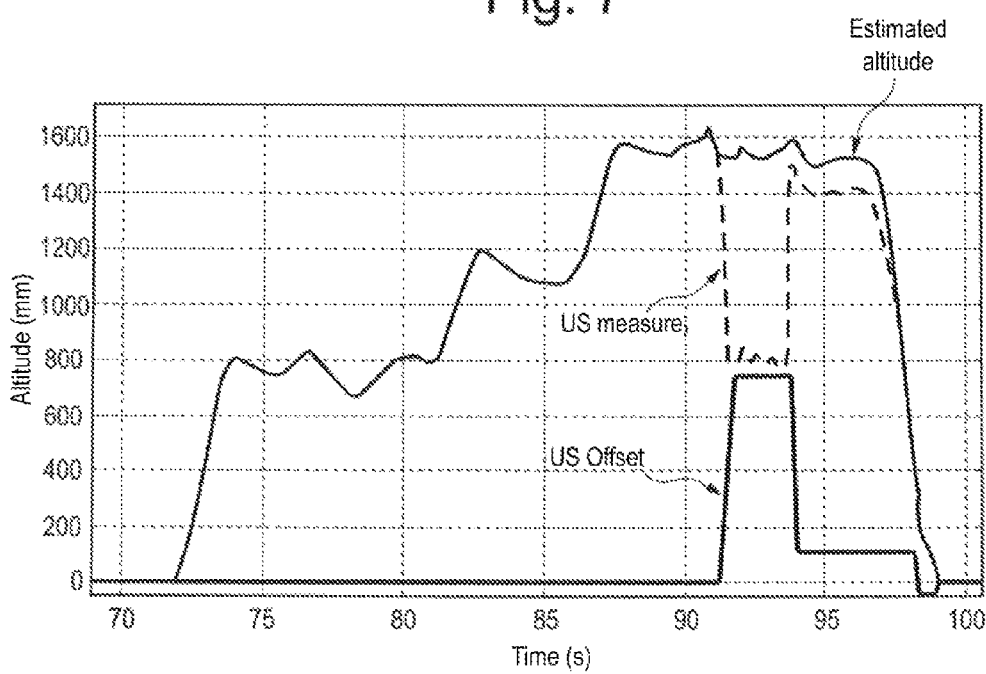
FIG. 8 illustrates the updating of the offset applied to the raw measure delivered by the US sensor when passing an obstacle, to avoid that the drone do terrain following when overflying this obstacle.

An example of this case is illustrated in FIG. 8. The passing of an obstacle corresponds to the anomaly detected at t=91-94 s. At the time of arriving on the obstacle (toward t=91 s), the offset is used to keep a substantially constant estimation of altitude. After the obstacle clearing (toward t=94 s), the offset is recalculated based on the first US measure considered as valid after the rejection of the preceding values. This permits to avoid that the drone does terrain following, in particular if, after the obstacle, the ground is not at the same level as before the obstacle.

Data Correction/Compensation in Presence of Obstacles

In various circumstances, the distance telemetry measurement by the US sensor may be disturbed by obstacles.

Figure 9:
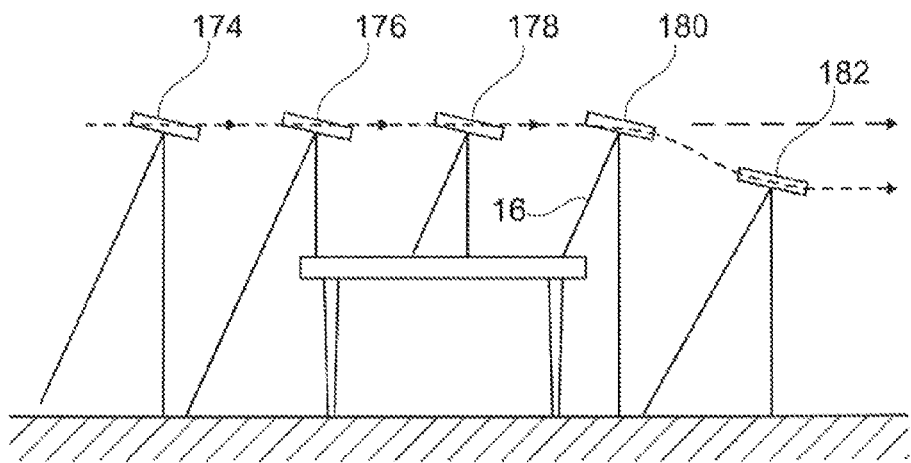
FIG. 9 illustrates a phenomenon of loss of altitude by the drone after passing and moving away from an obstacle, due to the tilt of the drone during this overflight.

A first phenomenon is schematically illustrated in FIG. 9, where it can be seen that the drone in horizontal progression (successive positions 174 to 180) tends to loss altitude just after the obstacle clearing (position 180). This phenomenon is due to the fact that, even after the drone has gone past the obstacle (positions 180 and 182), the beam 16 remains oriented toward the latter because the drone is slightly tilted forward (so that a horizontal speed can be imparted to it). Therefore, the telemeter sees the obstacle going away and converts into vertical speed a part of the horizontal speed: the estimator will then wrongly estimate that the drone is climbing and apply a compensation offset that, in reality, will lead to a loss of altitude of the drone (position 182).

Figure 10:
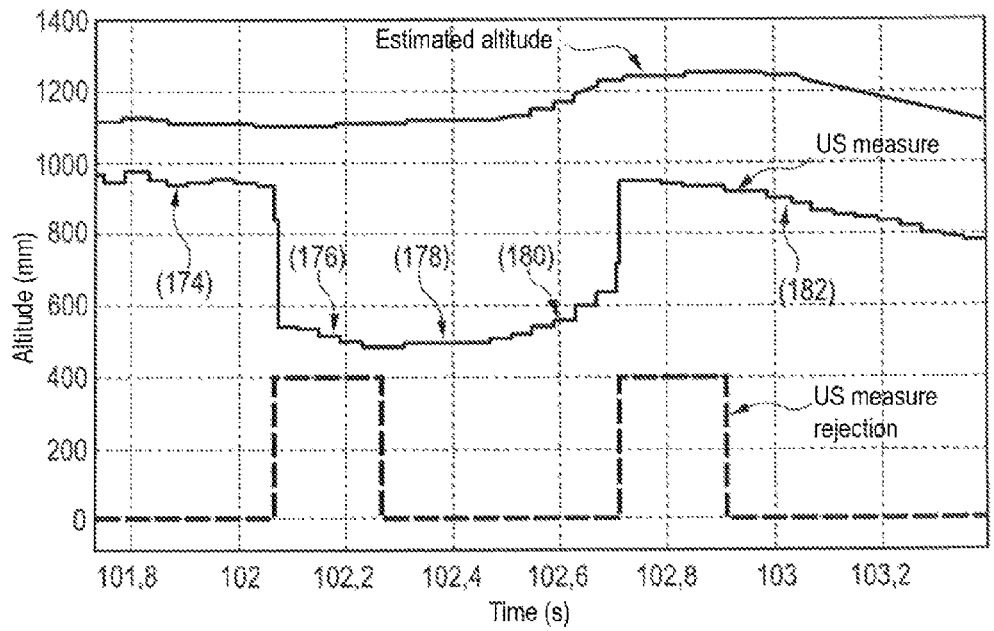
FIG. 10 is a chronogram showing the variation of the various signals in the obstacle-passing configuration shown in FIG. 9, as well as the successive states of the Boolean indicator of rejection of the signal delivered by the US sensor.

FIG. 10 shows the variation of the various signals (measure delivered by the US telemeter, altitude delivered by the estimator and Boolean indicator of rejection of the US measure) before, during and after the overflight of the obstacle in the configuration of FIG. 9:

when the drone approaches the obstacle (position 176 of FIG. 9), the US measure presents a reduction, but the latter is with no consequence because it corresponds to a period in which the US measure is rejected;

on the other hand, just after the obstacle has been cleared (position 180), the measure is no longer rejected and the virtual increase of altitude, of about 15 cm, due to the tilt of the drone, leads the estimator to apply a corrective measure through recalculation of the offset to compensate for this (supposed) increase, by modifying the setpoints so as to go down by 15 cm.

Figure 11:
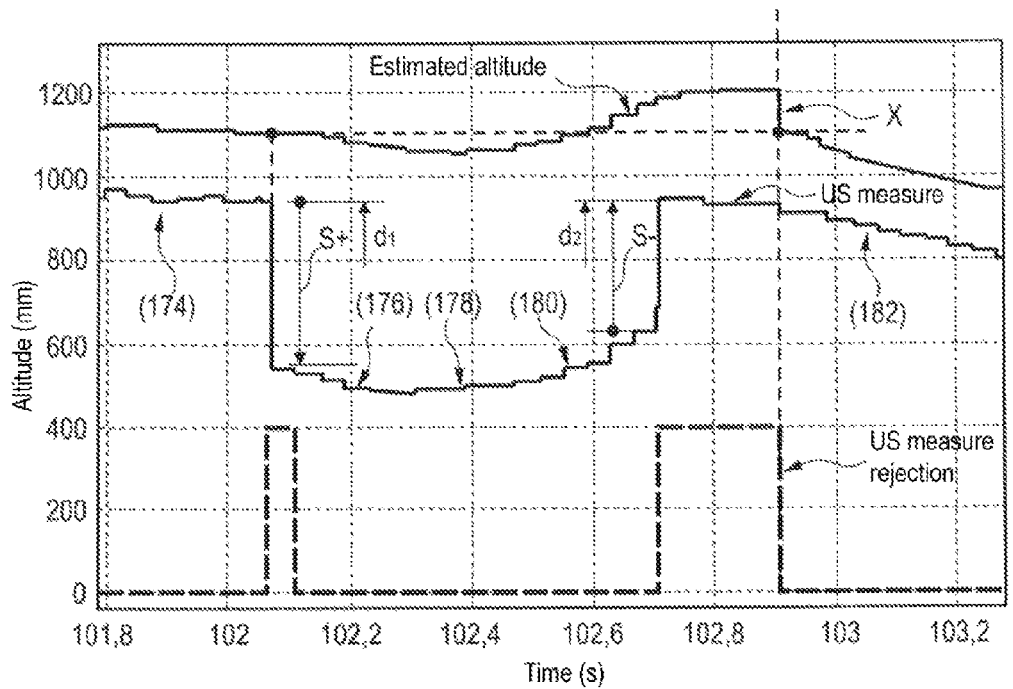
FIG. 11 is a chronogram showing the way to manage the offset applied to the raw measure delivered by the US sensor, in the obstacle-clearing configuration of FIGS. 9 and 10.

To make up for this phenomenon and avoid the drone to constantly loss altitude, the invention proposes to apply an algorithm for managing the obstacle jumps and managing the offset, whose effects are illustrated by the chronograms of FIG. 11 (which are homologous to those of FIG. 10, but with application of the management algorithm according to the invention).

This algorithm is activated when the drone detects the overflight and the end of clearing of an obstacle, when two conditions are fulfilled:

presence in the measure of the US sensor of two consecutive jumps of opposite signs (S+ and S− in FIG. 11), and delivery by the US sensor of substantially equal distance values (within a predetermined threshold) at the time of the first jump and at the time of the second hop ($d_1$ and $d_2$ in FIG. 11).

If these conditions are fulfilled, it is considered that i) an obstacle has been overflown and cleared, and ii) that the ground level after the obstacle is substantially the same as that before the obstacle.

In such a case, the offset is no longer recalculated, but is forced to take the value it has before the obstacle clearing. The effect of this correction is visible in FIG. 11, at X on the estimated altitude, where it can be seen that, after the obstacle has been cleared, the altitude estimation takes back substantially the level it has before the obstacle has been approached and cleared. In other words, at the time of the obstacle exit, while the error previously noticed on the measure of 15 cm is present, this error is corrected afterward, when the measure of the US sensor is no longer rejected. The difference between the measure of the US sensor and the altitude estimation is thus identical before and after the obstacle, and the phenomenon of altitude loss is eliminated.

As a precaution, this detection and compensation algorithm is activated only when the ground quality is considered as being good, due to the too high variations of the US sensor measure observed when passing an obstacle of poor reflective quality.

A second phenomenon produced by an obstacle occurs when the drone is in fixed point condition at the boundary of an obstacle.

Figure 12:
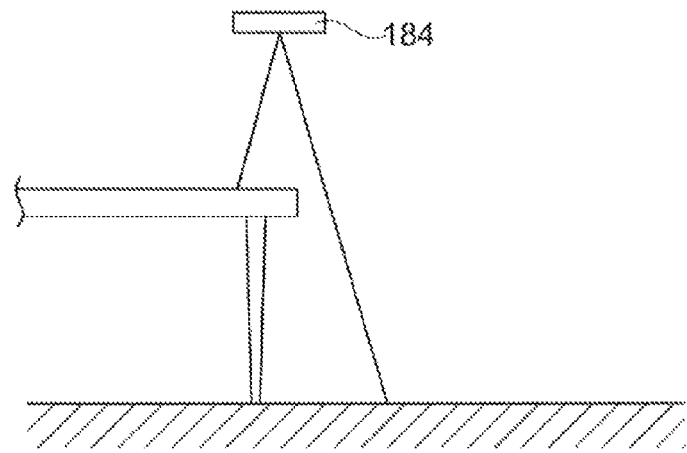
FIG. 12 illustrates a phenomenon of instability of the measure delivered by the US sensor of the drone when the latter overflies in fixed-point condition the boundary of an obstacle.

This situation is illustrated at 184 in FIG. 12.

When the drone is in fixed point condition at the boundary of a sharp obstacle, for example a table edge, the measure provided by the US sensor is very unstable and jumps permanently between two values, i.e. the distance from the drone to the table and the distance from the drone to the ground.

Figure 13:
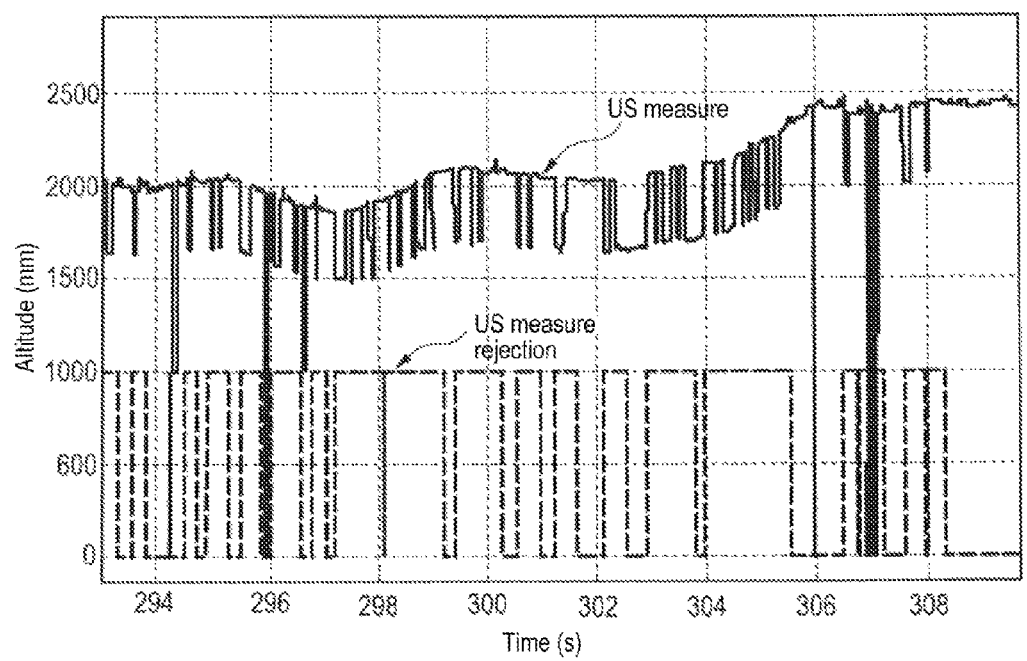
FIG. 13 is a chronogram showing the variations of the raw measure delivered by the US sensor in the configuration of fixed point at obstacle boundary of FIG. 12, as well as the successive states of the Boolean indicator of rejection of the signal delivered by the US sensor.

FIG. 13 shows these variations of the raw measure, as well as the successive states of the Boolean indicator of rejection of the US signal.

The test of coherence exposed hereinabove, which requires at least five successive compliant measures to validate the measure given by the US sensor, causes in such a case very frequent rejections, so that the drone does not keep correctly its altitude in the fixed point condition: indeed, the altitude evaluation is essentially based in this case on the pressure sensor, but the accuracy of the latter is not sufficient to provide a suitable stabilization in fixed-point condition.

It is however a pity to reject the US measure in such a situation because, except the jumps, the measure is very stable and it is very easy to see the variations of altitude of the drone, of the order of 50 cm in FIG. 13, corresponding to the performance of the pressure sensor.

To make up for this second phenomenon, a specific algorithm is activated when the drone is in fixed point condition (such flight condition being known and corresponding to an "auto-piloted" state of the drone).

A jump is defined as a difference on the US sensor measure of, for example, at least 50 cm. When such a jump is detected, the value of this jump is deducted from the following measures recorded in the history of the last five measures.

The history thus contains no longer the raw measures, but the measures smoothed after elimination of the jumps. If, leaving aside the jumps, the measure is stable, this produces a relatively uniform curve that does not trigger the measure rejection by the coherence checking algorithm. On the other hand, in the case of a poor quality ground, the US sensor measure is noisy and contains variations at all the frequencies. In this case, even after elimination of the jumps, the result remains noisy and the coherence checking algorithm continues to operate suitably, to validate only the compliant measures.

Figure 14:
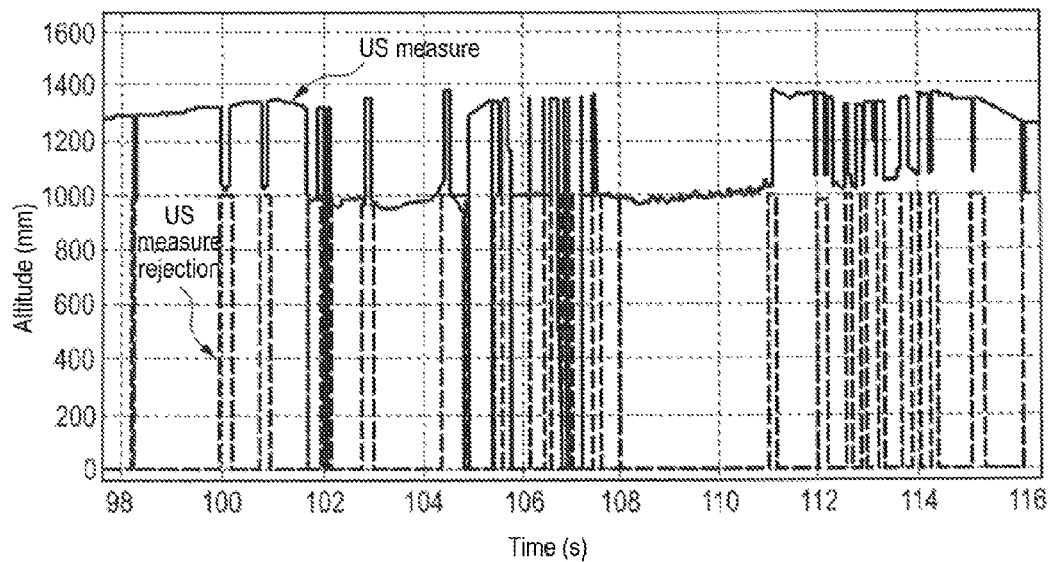
FIG. 14 is a chronogram illustrating the application of the algorithm for correcting the US sensor measures in the configuration of FIGS. 12 and 13.

The result obtained is illustrated in FIG. 14: in case of jump, only the first measure is rejected, and it is no longer necessary to wait for five subsequent measures to regain a validation of the US measure. Moreover, the use of the obstacle jump managing algorithm ensures that the absolute reference of the ground is not lost: the offset of the US signal oscillates between two values but does not diverge, and the drone keeps correctly its altitude: in FIG. 14, it is thus observed a very low altitude variation, which does not exceed about 10 cm between the beginning and end of the chronogram.

A third phenomenon liable to disturb the operation of the US sensor is that which results from a loss of any measure delivered by this sensor, due to the sudden disappearance of any echo.

Figure 15:
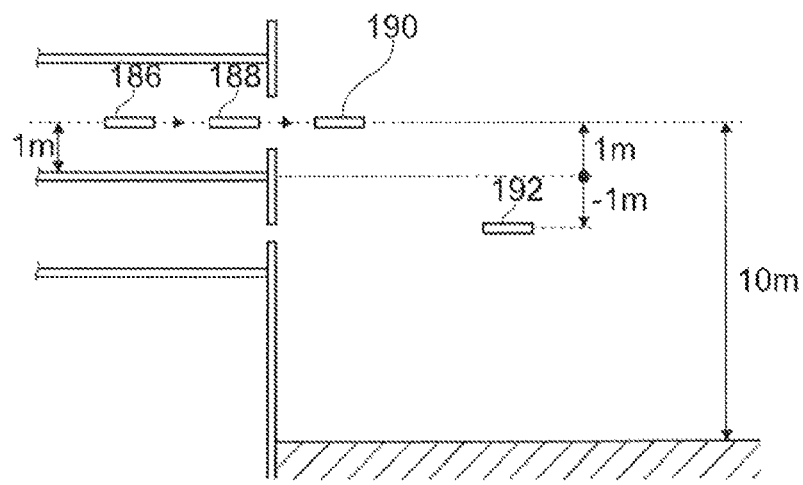
FIG. 15 illustrates the phenomenon of loss of the signal delivered by the US sensor of the drone in case of sudden increase of the distance with respect to the ground.

An example of this phenomenon is illustrated in FIG. 15: the drone progresses in a room, at relatively low altitude, for example 1m from the floor (positions 186 and 188), then goes through a window (position 190). If the room were upstairs, the drone then ends up at a far higher altitude, for example 10m from the ground. In this case, the altitude value delivered by the estimator continues to be integrated thanks to the pressure sensor, by the offset is no longer updated. Yet, this offset is important because, by difference with the altitude of the drone, it allows calculating the distance to the ground, which is an important parameter, in particular for the vision algorithm serving to analyze the image of the vertical camera serving to evaluate the horizontal speed of the drone.

When the US measure is lost, the distance to the ground returned to the calculator of the drone is the estimated altitude, corrected by the last offset calculated. In the case illustrated in FIG. 15, after the drone has gone through the window (position 190), this distance to the ground will still be considered as equal to 1 m, so that if the drone goes down, for example, of 2 m (position 192), the distance to the ground after application of the offset will be of −1 m, which is an incoherent value.

To make up for this phenomenon, the invention proposes a specific offset management algorithm executed when the drone is at high altitude (the "high altitude" being an altitude higher than the operating range of the US telemetry sensors, typically an altitude higher than 6 m).

When the US sensor measure has disappeared for a duration longer than 2 s for example, that means that the drone is far from the ground, and the value of the distance to the ground is evaluated based on the memorized offset:
- if this distance is higher than 6 m, the operation is not modified and the offset value is recorded;
- if it is lower than 6 m, that means that it is not correct and that the drone has probably passed above a drop (it has passed through a window, it has passed above a hole, etc.).
- In the latter case, the offset value has to be modified:
- if a suitable recorded offset value exists, the latter is taken back and used;
- in the opposite case, the distance to the ground is fixed to an arbitrary value, for example 6m.

Figure 16:
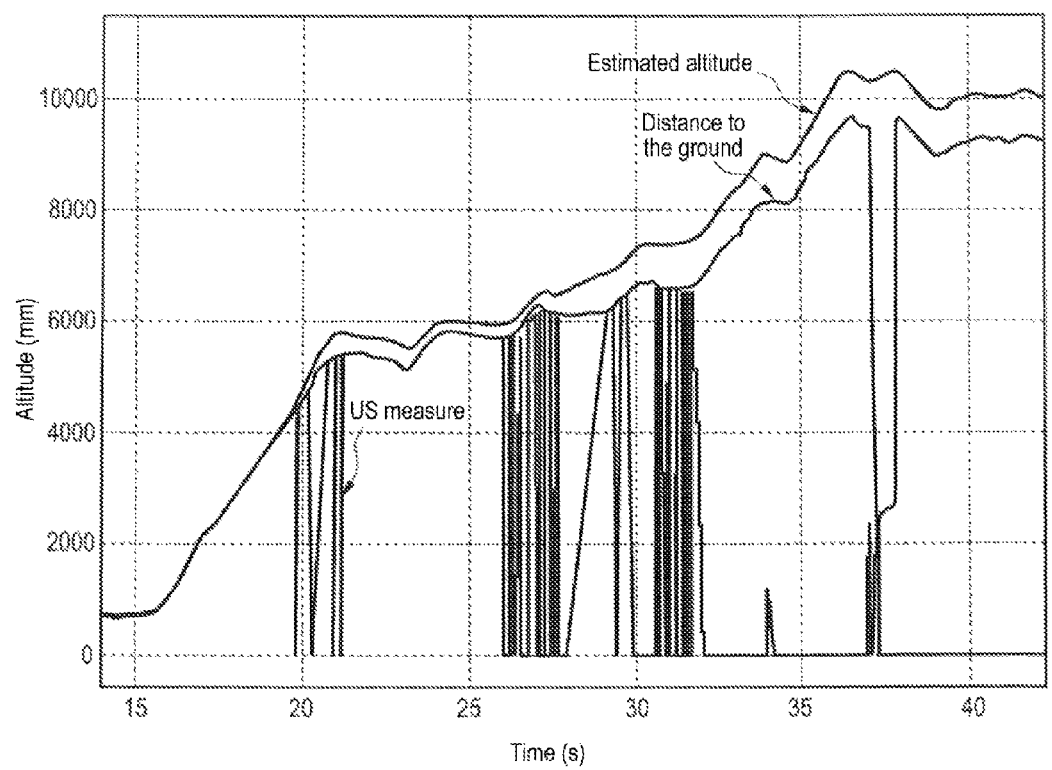
FIG. 16 is a chronogram illustrating the application of the algorithm for correcting the measures and readjusting the values estimated by the configuration of FIG. 15.

FIG. 16 illustrates the results obtained when the drone flies in a courtyard.

At the beginning, the drone lifts off from the ground. During the ascending phase (t=15 s to t=20 s), the distance to the ground remains in the operating range of US telemetry sensor and the altitude is thus suitably evaluated by the estimator, after correction of the offset obtained by analysis of the US sensor signal.

From t=20 s, the altitude of the drone approaches the US sensor range limits and US signal losses are observed, which goes repeating, until total loss of the signal, at t>32 s. After t=33 s, as the altitude is higher than 4 m, the last offset value recorded at that time is kept and memorized. Toward t=37 s, the drone moves closer to a wall, which produces the return of some echoes, which then disappear when the drone moves away from this wall. After the reappearance/disappearance of the US signal due to the lock on the wall, the previously memorized offset is applied, which allows keeping a substantially constant value of distance to the ground despite the sudden trough presented by the measure of this value upon this locking-on.

It will be noted that, in the example of FIG. 16, the distance to the ground has been able to be estimated at the beginning of the flight, which enables it to be restored after the window locking-on. In the example of FIG. 15, with a lift-off directly from a window, there had been no offset memorized and the distance to the ground had been arbitrarily fixed to 6 m.

The invention claimed is:

1. A rotary-wing drone (10) with multiple rotors (12) driven by respective motors (110) controlled by application of differentiated motor commands (158) so as to pilot the drone in attitude and speed, said drone comprising altitude estimator circuit (134), adapted to deliver an absolute altitude value of the drone expressed in an absolute terrestrial system, comprising:
    a telemetry sensor (154), adapted to estimate a relative distance separating the drone from a surface (18) reflecting echoes of ultrasound pulses emitted by the drone,
    characterized in that the altitude estimator circuit (134) further comprise:
    a barometric sensor (156), adapted to deliver a drone altitude variation signal;
    an estimator (152), receiving as an input the signals delivered by the telemetry sensor and by the barometric sensor, and combining these signals to deliver as an output said absolute value of altitude of the drone;
    a state estimator module for validating the signal delivered by the telemetry sensor, adapted to analyze the echoes reflected, and, based on the result of this analysis, to modify accordingly the parameters of the estimator and/or allow or inhibit the application to the estimator of the signal delivered by the telemetry sensor; and
    wherein the state estimator module is further adapted to analyze the echoes reflected, and, based on the result of this analysis, to deduce the presence and the configuration of an obstacle in the operating range of the telemetry sensor and to apply to the estimator a corrective action adapted to compensate for the effect of the obstacle on the relative distance estimated by the telemetry sensor.

2. The drone of claim 1, wherein the estimator comprises a predictive filter (152) incorporating a representation of a dynamic model of the drone, this filter being adapted to perform a prediction of said absolute value of altitude of the drone based on said motor commands (158) and to periodically readjust this prediction as a function of the signals delivered by the telemetry sensor (154) and by the barometric sensor (156).

3. The drone of claim 2, wherein the predictive filter is in particular a four-state filter, comprising: said absolute value of altitude, counted with respect to a lift-off position of the drone; a component of drone vertical speed; a bias of said motor commands with respect to said dynamic model of the drone; and a bias of the barometric sensor.

4. The drone of claim 1, wherein the state estimator module estimates the quality of said surface reflecting the echoes, as a function of the number of echoes received concurrently for a same pulse emitted.

5. The drone of claim 1, wherein the state estimator module estimates the quality of said surface reflecting the echoes, as a function of the dispersion between the distance values obtained for a time succession of pulses emitted by the telemetry sensor.

6. The drone of claim 1, wherein the validation means comprise means for rejecting the distance values estimated by the telemetry sensor, as a function of an analysis of coherence of a plurality of distance values obtained for a time succession of pulses emitted by the telemetry sensor.

7. The drone of claim 6, wherein the distance values are rejected with respect to variable thresholds, as a function of an estimation of quality of the surface reflecting the echoes.

8. The drone of claim 6, wherein the state estimator module further calculates an altitude offset value (OFFSET) at the time when the estimated distance values are rejected, and for adding this offset value to the estimated distance value when the the estimated distance values are not rejected.

9. The drone of claim 1, wherein the state estimator module rejects the distance values estimated by the telemetry sensor, as a function of the difference of a current distance value with respect to a distance prediction obtained from a plurality of distance values obtained for a time succession of pulses emitted by the telemetry sensor.

10. The drone of claim 9, wherein the distance values are rejected with respect to variable thresholds, as a function of an estimation of quality of the surface reflecting the echoes.

11. The drone of claim 9, wherein the state estimator module further calculates an altitude offset value (OFFSET) at the time when the estimated distance values are rejected, and for adding this offset value to the estimated distance value when the the estimated distance values are not rejected.

12. The drone of claim 1, wherein the state estimator module detects in the distance values obtained for a time succession of pulses emitted by the telemetry sensor, two consecutive jumps of opposite sign with similar distance values obtained before and after these two jumps.

13. The drone of claim 12, wherein the state estimator module further calculates an altitude offset value (OFFSET) at the time of the first jump, and for adding this offset value to the distance value estimated at the time of the second jump.

14. The drone of claim 1, wherein the state estimator module detects oscillation, between two values, of the distance values obtained for a time succession of pulses emitted by the telemetry sensor when the drone is in a fixed-point state.

15. The drone of claim 14, wherein the state estimator module further smoothes the distance values successively obtained in the presence of a detected oscillation.

16. The drone of claim 1, wherein the state estimator module detects a loss of the signal delivered by the telemetry sensor due to an absence of reflected echo, to calculate an altitude offset value (OFFSET) at the time of this loss of signal, and to apply this offset value as a telemetry signal at the input of the estimator.

17. The drone of claim 16, wherein, in case of telemetry signal loss: i) if the altitude of the drone is lower than a given threshold altitude, the recorded offset value is applied at the input of the estimator if this recorded value is present, a predetermined value being applied in the opposite case, and ii) if the altitude of the drone is higher than said given threshold altitude, the recorded offset value is applied unchanged at the input of the estimator.

* * * * *